United States Patent
Zheng et al.

(10) Patent No.: US 9,996,390 B2
(45) Date of Patent: Jun. 12, 2018

(54) METHOD AND SYSTEM FOR PERFORMING ADAPTIVE CONTEXT SWITCHING

(71) Applicant: Samsung Electronics Co., Ltd., Gyeonggi-do (KR)

(72) Inventors: Hongzhong Zheng, Sunnyvale, CA (US); Suhas, Sunnyvale, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 469 days.

(21) Appl. No.: 14/636,484

(22) Filed: Mar. 3, 2015

(65) Prior Publication Data

US 2015/0355936 A1 Dec. 10, 2015

Related U.S. Application Data

(60) Provisional application No. 62/010,272, filed on Jun. 10, 2014.

(51) Int. Cl.
*G06F 9/46* (2006.01)
*G06F 9/48* (2006.01)

(52) U.S. Cl.
CPC ...... *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 6,061,774 A | 5/2000 | Witek | |
| 6,577,600 B1* | 6/2003 | Bare | H04M 15/8016 |
| | | | 370/238 |
| 6,957,298 B1 | 10/2005 | Van Dyke | |
| 7,191,319 B1 | 3/2007 | Dwyer | |
| 7,472,256 B1* | 12/2008 | Nair | G06F 9/383 |
| | | | 712/207 |
| 7,954,102 B2 | 5/2011 | Okawara | |
| 8,140,825 B2 | 3/2012 | Balakrishnan | |
| 8,230,154 B2 | 7/2012 | Saac | |
| 8,230,423 B2 | 7/2012 | Frigo | |
| 9,354,813 B1* | 5/2016 | Dolan | G06F 3/0647 |
| 2008/0016308 A1* | 1/2008 | Bartley | G06F 12/0802 |
| | | | 711/167 |

(Continued)

OTHER PUBLICATIONS

Tanaka, K., "Fast context switching by hierarchical task allocation and reconfigurable cache," Innovative Architecture for Future Generation High-Performance Processors and Systems, Publication date: 2003, pp. 20-9 ISBN-10: 0 7695 2019 7.

(Continued)

*Primary Examiner* — Dong Kim
(74) *Attorney, Agent, or Firm* — Convergent Law Group LLP

(57) ABSTRACT

Exemplary embodiments provide a method for managing a transaction for a memory module in a computer system. The memory modules have latencies. A busyness level of the memory module for the transaction is determined. A projected response time for the transaction is predicted based on the busyness level. In some embodiments whether to perform a context switching for the transaction is determined based on the projected response time and context switching policies. The context switching may be performed based on this determination.

18 Claims, 5 Drawing Sheets

(56) References Cited

U.S. PATENT DOCUMENTS

| | | |
|---|---|---|
| 2009/0125703 A1 | 5/2009 | Mejdrich |
| 2010/0251260 A1 | 9/2010 | May |
| 2011/0161976 A1* | 6/2011 | Alexander ............ G06F 9/5066 718/104 |
| 2011/0194619 A1* | 8/2011 | Yu .......................... H04N 19/30 375/240.26 |
| 2011/0199899 A1* | 8/2011 | Lemaire .............. H04L 47/2416 370/230.1 |
| 2011/0239225 A1 | 9/2011 | Won |
| 2012/0047516 A1 | 2/2012 | Barwick |
| 2012/0188817 A1* | 7/2012 | Kim .................... G11C 11/1673 365/171 |
| 2012/0194524 A1 | 8/2012 | Hartog |
| 2013/0111107 A1* | 5/2013 | Chang ..................... G06F 12/10 711/103 |
| 2014/0022266 A1* | 1/2014 | Metz ......................... G06T 1/20 345/522 |
| 2014/0281149 A1* | 9/2014 | Roberts ................. G06F 12/023 711/103 |
| 2014/0365753 A1* | 12/2014 | Hooker ............... G06F 9/30058 712/239 |
| 2015/0277906 A1* | 10/2015 | Johnson ................ G06F 9/3005 712/225 |

OTHER PUBLICATIONS

Yoo, R. et al., "Adaptive transaction scheduling for transactional memory systems," SPAA '08 Proceedings of the twentieth annual symposium on Parallelism in algorithms and architectures pp. 169-178, ACM New York, NY, USA ©2008, ISBN: 978-1-59593-973-9.

* cited by examiner

METHOD AND SYSTEM FOR PERFORMING ADAPTIVE CONTEXT SWITCHING

CROSS-REFERENCE TO RELATED APPLICATIONS

This application claims the benefit of provisional Patent Application Ser. No. 62/010,272, filed Jun. 10, 2014, entitled ADAPTIVE CONTEXT SWITCH MECHANISM FOR NEW MEMORY SYSTEMS, assigned to the assignee of the present application, and incorporated herein by reference.

BACKGROUND

Computer systems frequently include multiple memory modules, such as dynamic random access memory (DRAM), solid state drives (SSDs) and hard disk drives (HDDs). The memory modules interface with the operating systems of and/or applications on the host computers with which memory modules are used. The memory modules may have different latencies. For example, the latency for an access of a DRAM is typically approximately fifty nanoseconds for both read and write transactions. HDDs and SSDs have latencies that are significantly longer than that of a DRAM. The latencies for these devices are typically greater than fifty microseconds for read and write transactions.

During use, the operating system or other application may write data to or read data from a memory module. For example, the central processing unit (CPU) of the system may issue a read request or a write request for the appropriate module. Such memory module transactions take time to complete. For some modules, the CPU (or operating system/application) switches from the transaction being performed (memory module access) to another task for some predefined time. The CPU later switches back to the memory module transaction. This process is known as context switching.

Context switching is not without a penalty. A context switch typically requires at least five through fifteen microseconds to complete. As such, the computer system only performs context switching for memory modules with a high latency. For HDDs and SDDs, the latency is greater than fifty microseconds. For such high latency devices, context switching is performed for transactions because the time taken for the memory module transaction is greater than the penalty for context switching. For a low latency module such as DRAM, the latency of fifty nanoseconds is less than the penalty for context switching. For such an access the CPU waits for the access to complete and context switching is not performed. Thus, the determination of whether to context switching is preset and depends upon the type of memory module. Although context switching is useful, greater control over transactions with the memory modules may be desired.

BRIEF SUMMARY

Exemplary embodiments provide a method for managing a transaction for a memory module of a number of memory modules in a computer system. The memory modules have latencies. A busyness level of the memory module for the transaction is determined. A projected response time for the transaction is predicted based on the busyness level. In some embodiments whether to perform a context switching for the transaction is determined based on the projected response time and context switching policies. The context switching may be performed based on this determination.

According to the method and system disclosed herein, the exemplary embodiments provide a mechanism for improving efficiency of memory transactions.

DETAILED DESCRIPTION

Figure 1:
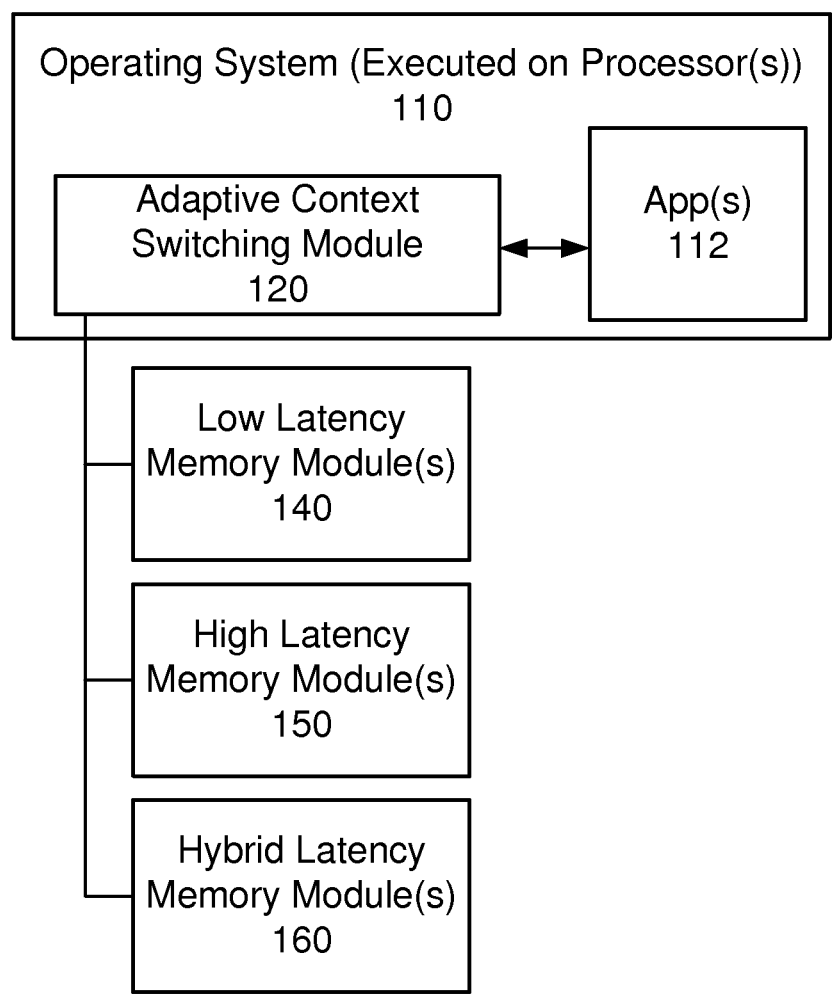
FIG. 1 is a block diagram of an exemplary embodiment of a computer system including an adaptive context switching module.

The following description is presented to enable one of ordinary skill in the art to make and use the invention and is provided in the context of a patent application and its requirements. Various modifications to the exemplary embodiments and the generic principles and features described herein will be apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of the invention. Further, although specific blocks are depicted, various functions of the blocks may be separated into different blocks or combined. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein. Reference is thus made in detail to the embodiments of the present general inventive concept, examples of which are illustrated in the accompanying drawings, wherein like reference numerals refer to the like elements throughout.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified.

The term "component" or "module", as used herein, means, but is not limited to, a software or hardware component which performs certain tasks. A component or module may advantageously be configured to reside in a storage medium and configured to execute on one or more processors. Thus, a component or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components and components or modules or further separated into additional components and components or modules.

Figure 2:
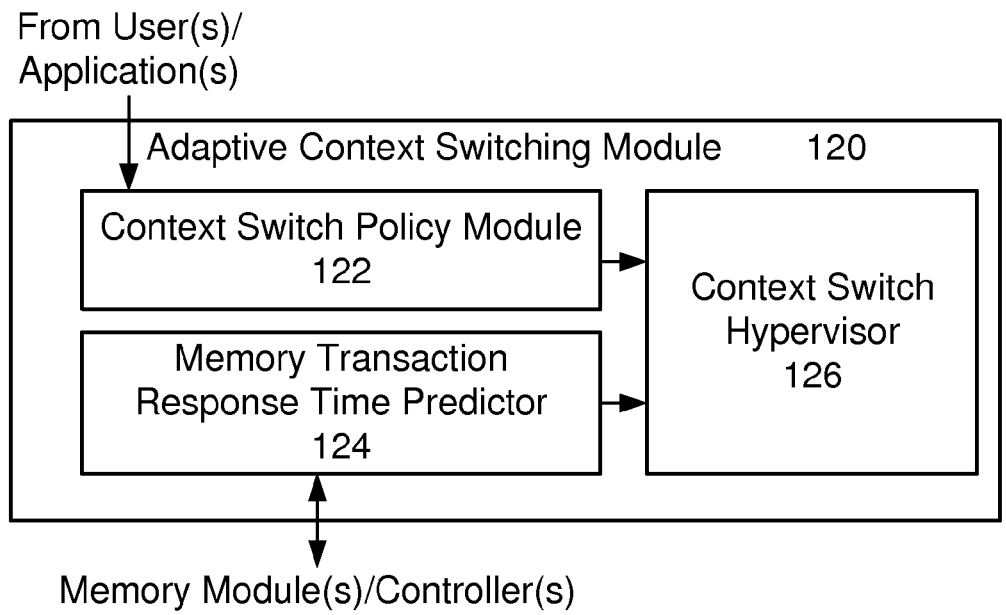
FIG. 2 is a block diagram of a portion of a computer system including another exemplary embodiment of an adaptive context switching module.

FIG. 1 is a block diagram illustrating an exemplary embodiment of a computer system 100 having an operating system 110 and applications 112 executed on one or more processors and memory modules 140, 150, and 160. Memory module(s) 140 have a low latency, generally on the order of fifty nanoseconds for accesses. Memory module(s) 150 have a high latency, typically greater than fifty microseconds. Hybrid memory module(s) 160 may have a low latency for some operations or conditions of the system 100 and a high latency for other operations or conditions. These memory modules 140, 150 and 160 are further discussed below. The memory module(s) 140 and/or 150 might be omitted. For simplicity, only some components are shown. Other components, including but not limited to input/output devices such as a keyboard, mouse and display, may be included in the computer system 100. The computer system 100 also includes an adaptive context switching module 120. As discussed below, the adaptive context switching module 120 may control context switching for accesses of the memory module(s) 140, 150 and 160. FIG. 2 is a block diagram illustrating one embodiment of the adaptive context switching module 120. The computer system 100 depicted in FIG. 1 is thus described in the context of the adaptive context switching module 120 depicted in FIG. 2. As seen in FIG. 2, the adaptive context switching module 120 includes a context switch policy module 122, a memory transaction response time predictor 124 and a context switch hypervisor 126. However, the functions modules 122, 124 and 126 depicted in FIG. 2 may be separated in another manner and the adaptive context switching module may be configured in another manner.

Referring to FIGS. 1 and 2, the low latency memory module(s) 140 have a low latency. These low latencies are much less than the time penalty for context switching, which may be on the order of five through fifteen microseconds. For example, modules including but not limited to DRAM modules having a latency on the order of fifty nanoseconds may be present in the low latency memory module(s) 140. Other low latencies are possible. The high latency memory module(s) 150 have a significantly higher latency than the time penalty for context switching. For example, high latency memory module(s) 150 may include SSDs and/or HDDs having latencies in excess of fifty microseconds.

The hybrid latency memory module(s) 160 have latencies that are in some instances less than the time period of interest but in other cases greater than the time period of interest. In some embodiments, this time period of interest is the time penalty for context switching. Thus, the modules 160 have latencies that may be considered a hybrid of low and high latencies. Such hybrid latency memory modules 160 may be newer types of memory. Examples of hybrid latency memory modules include magnetic random access memory (MRAM) modules and resistive memory modules. For example, MRAM modules may have a latency range from approximately five hundred nanoseconds to approximately fifty microseconds. For transactions having latencies in the five hundred nanosecond regime, context switching is generally undesirable. For transactions in the ten to twenty microsecond range or higher, context switching may be desired. Further, MRAM or other hybrid latency memory modules 160 may have asymmetric latencies. For example, the latency for a write access may be greater than thrice the latency for a read access. It is possible, therefore, that the latency for a read transaction may be less than the context switching time penalty while the latency for a write transaction may be greater than the context switching time penalty under the same conditions. A mechanism for managing memory module transactions in the computer system 100, particularly those involving hybrid memory modules 160, may be desired.

The adaptive context switching module 120 provides such a mechanism for managing memory transactions in the computer system 100. In particular, the adaptive context switching module 120 monitors busyness of one or more of the modules 140, 150 and/or 160. For a transaction for the memory modules 140, 150 and 160 the adaptive context switching module 120 determines the busyness level for the appropriate memory module and predicts a projected response time for the transaction based on the busyness level. These functions may be achieved using the memory transaction response time predictor 124. The determination of the busyness level may be based upon factors such as previous response times for the memory module, a global queue depth for the computer system 100, local read queue depth for the memory module being accessed, a local write queue depth for the memory module being accessed and/or other factors. The projected response time may be an actual calculated time specific to the transaction or a value indicating the busyness level in comparison to particular thresholds. The projected response time and/or busyness level are provided from the memory transaction response time predictor 124 to the context switch hypervisor 126.

The adaptive context switching module 120 may also perform context switching based on the projected response time and one or more context switching policies. Context switching policies provide the criteria for determining whether a context switch should be made for a particular transaction and memory module 140, 150 and/or 160. For example, the context switching policies may indicate that the computer system 100 should perform context switching if the busyness or projected response time exceed a particular threshold for one or more of the memory modules 140, 150 and 160. This threshold may be the time penalty for context switching or a particular busyness level associated with such a time penalty. In other embodiments, other thresholds are possible. The adaptive context switching module 120 may manage and store these context switching policies using the context switch policy module 122. For example, context switching policies for the memory modules 140, 150 and/or 160 may be entered by a user, provided by one or more of the applications or otherwise input to the computer system 100. The context switch policy module 122 interfaces with the remainder of the computer system 100 to receive, change and store context switching policies. The context switch policy module 122 provides the relevant information from the context switching policies to the context switch hypervisor 126.

The context switch hypervisor 126 determines whether a context switch should be performed. The context switch hypervisor 126 uses the busyness level and/or response time predictor provided by the memory transaction response time predictor 124 and the context switching policy provided by the context switch policy module 122 to make this determination. Based on a comparison of the busyness level and/or response time predictor with the switching criteria from the relevant context switching policies, context switching may be performed by the adaptive context switch module 120.

Using the adaptive context switching module 120, traffic to the memory modules 140, 150 and 160 may be better managed. For the low latency memory modules 140, the context switching policies may indicate that context switching is not to be performed. Such a policy may be desirable because the latency for these modules 140 is less than the context switching time penalty. Thus, the adaptive context switching module 120 may not perform context switching for transactions for these modules 140. For the high latency memory modules 150, the context switching policies may indicate that context switching is always to be performed. Such a policy may be desirable because the latency for these modules 150 is greater than the context switching time penalty. Thus, the adaptive context switching module 120 may perform context switching for transactions for these modules 150. For transactions which access the memory modules 140 and 150, busyness and projected response time may not be determined because of the fixed relationship between the latencies and the context switching time penalty. The adaptive context switching module 120 may thus treat the modules 140 and 150 in a conventional manner.

The adaptive context switching module 120 also allows asymmetries in the memory module(s) 160 to be accounted for through the use of more complex policies and determinations of busyness. As discussed above, for hybrid memory module(s) 160 such as MRAM, write operations have a significantly higher latency than read operations. For embodiments in which MRAM module(s) are present in the hybrid latency memory module(s) 160, the busyness and projected response time may be determined separately for read and write transactions. The context switching policies managed by the context switch policy module 122 may have different thresholds for read and write operations. Thus, the adaptive context switch hypervisor 126 may determine a module 160 to be busy for the purposes of a longer latency write operation than for a short latency read operation even though the operations take place under the same conditions. In such a case, context switching is performed for the write operation but not for the read transaction. Thus, more complex context switching policies and asymmetric memory modules may be accommodated. Alternatively, other mechanisms may be used to account for asymmetries in the memory module(s) 160. Using the adaptive context switching module 120, therefore, performance of the computer system 100 may be enhanced.

Figure 3:
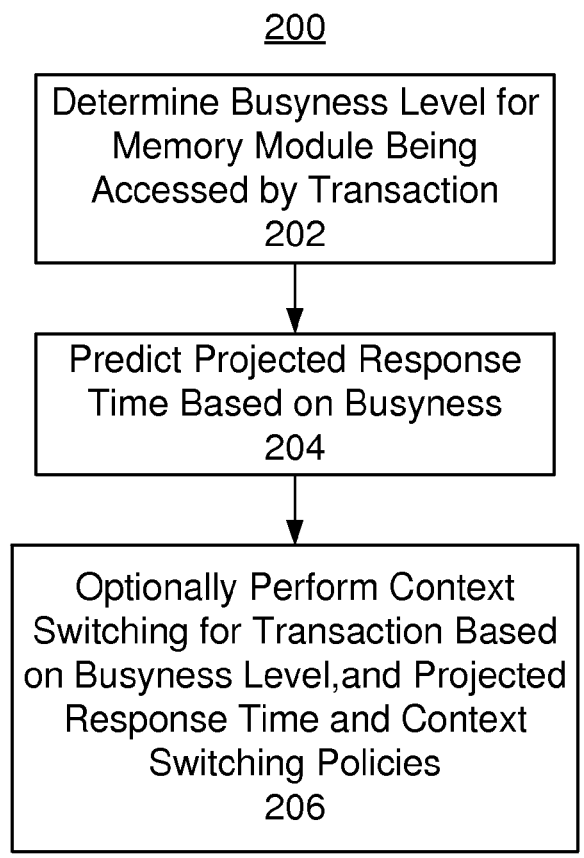
FIG. 3 is a flow chart depicting an exemplary embodiment of a method for determining busyness for a memory module and optionally performing context switching.

FIG. 3 is a flow chart depicting an exemplary embodiment of a method 200 for managing transactions for a memory module such as the memory module 140, 150 and/or, 160. For simplicity, some steps may be omitted or combined. The method 200 is described in the context of the computer system 100 and adaptive context switching module 120 of FIGS. 1-2. However, the method 200 may be used for other computer systems. As discussed above, the busyness level may or may not be determined for the low latency memory module(s) 140 and for the high latency memory module(s) 150 when the modules 140 and 150 are accessed. The method 200 is, therefore, described in the context of the memory module(s) 160.

Referring to FIGS. 1-3, the busyness of the memory module 160 being accessed by the transaction is determined by the memory response time predictor 124, via step 202. In some embodiments, step 202 may include determining the depths of one or more queues related to the memory module 160. For example, the depth of a global queue for the computer system 100, the local queue(s) for the memory module 160 being accessed or other relevant sources of delay. The busyness may be the sum of the normalized global queue depth, the normalized local read queue depth and the normalized write queue depth. Each depth may also be weighted. Thus, the busyness may be the sum of the global queue depth multiplied by its weight, the local read queue depth multiplied by its weight and the local write queue depth multiplied by its weight. The determination of the busyness in step 202 may include analyzing the previous response times for the hybrid memory module 160 that have been stored, for example in a histogram. In such an embodiment, the busyness determination and projected response time are determined in software. In other embodiments, the busyness determination may be made via hardware.

The projected response time is predicted based on the busyness level, via step 204. In some embodiments, step 204 may include interpolating from actual response times. Such an interpolation may incorporate the busyness level determined in step 202. In other embodiments, the projected response time may be determined from the latency, an idle latency or other predefined transaction times for the module. For hybrid/asymmetric modules 160 in FIGS. 1-2, the prediction of the projected response time accounts for the differences in read access latencies and write transaction latencies. For example, for a read transaction, the projected response time may be the read latency when the computer system is idle plus the busyness (normalized) multiplied by a normalized latency. Similarly, for a write transaction, the projected response time may be the write latency when the computer system is idle plus the busyness (normalized) multiplied by a normalized latency. In other embodiments, the projected response time may be calculated based on the busyness in another manner.

Context switching may be optionally performed for the transaction based on the busyness level, the projected response time and context switching policies, via step 206. For example, the projected response time calculated based on the busyness level may be compared to thresholds for the type of transaction (read/write) and the memory module 160. If the projected response time exceeds one or more thresholds, then the context switch hypervisor 126 may determine that context switching is to be performed. The adaptive context switching module 120 thus indicates that context switching is to be performed and the computer system 100 performs context switching.

Using the method 200, adaptive context switching may be performed for the system 100. The latency of the hybrid memory module(s) 160 may be accounted for using the method 200 and adaptive context manager 120. Context switching may thus be adapted to new memory module(s) 160. As a result, memory transactions in the computer system 100 may be more efficiently managed. In some embodiments, the projected response time may be determined from the latency, an idle latency or other predefined transaction times for the module. For asymmetric modules 160, the prediction of the projected response time can account for the differences in read access latencies and write transaction latencies. For example, for a read transaction, the projected response time may be the read latency when the computer system is idle plus the busyness (normalized) multiplied by a normalized latency. Similarly, for a write transaction, the projected response time may be the write latency when the computer system is idle plus the busyness (normalized) multiplied by a normalized latency. In other embodiments, the projected response time may be calculated based on the busyness in another manner.

Figure 4:
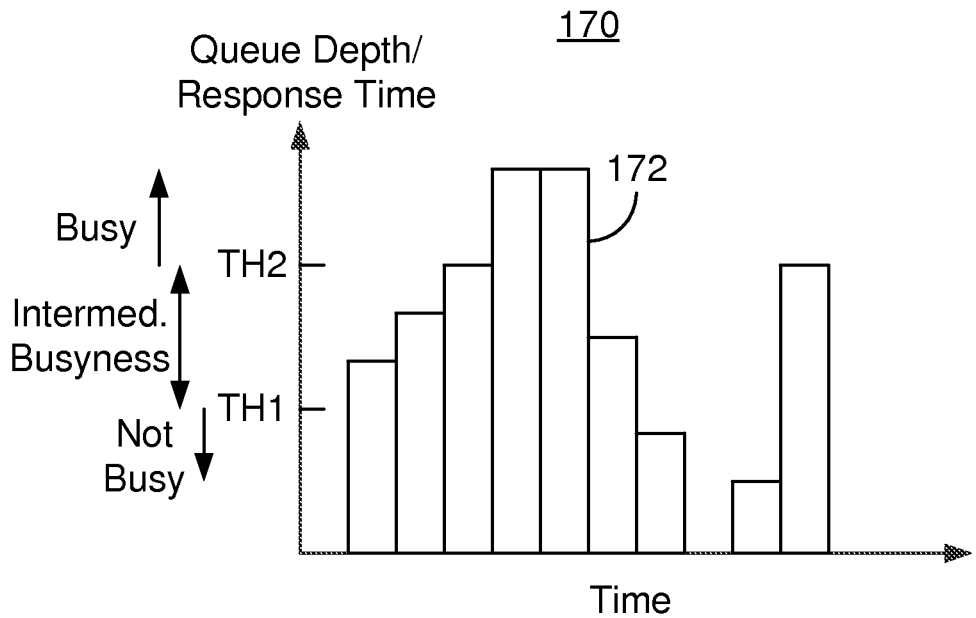
FIG. 4 is a diagram depicting one mechanism for determining busyness.

FIG. 4 depicts one embodiment of a histogram 170 that may be used in determining busyness and/or a projected response time in the method 200 depicted in FIG. 3. Various time periods, represented by bars 172, of which only one is labeled in FIG. 4, are shown. The height of a particular bar 172 corresponds to a particular response time or queue depth. As can be seen in FIG. 4, each bar 172 may correspond to a busyness level depending upon the comparison of the bar height with thresholds TH1 and TH2. Below TH1, the particular transaction may be for the computer system being not busy. Above TH2, the transaction may be for the computer system 100 being busy. Thus, such a transaction may have been subject to a context switch. Between TH1 and TH2 some other policy may hold. For example, context switching may still be performed if the remainder of the memory modules 140, 150 and 160 are not busy, but may be performed otherwise. In some embodiments, the determination of busyness using the histogram 170 may include averaging or otherwise interpolating a busyness level based on the response time or queue depth from one or more of the previous times 172. Thus, the histogram 170 may be used in determining a busyness level or projected response time in the method 200 of FIG. 3. The histogram 170, therefore, may improve implementation of the method 200.

Figure 5:
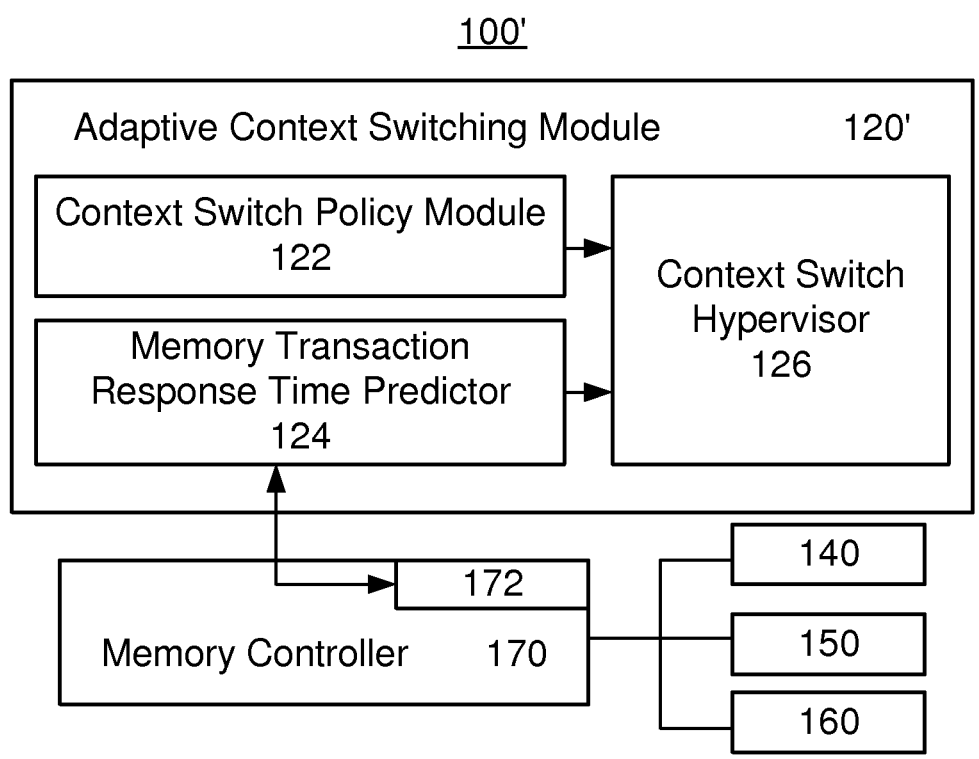
FIG. 5 is a block diagram of a computer system incorporating another exemplary embodiments of a context switching module utilizing hardware accessed busyness.

FIG. 5 depicts an embodiment of a computer system 100' in which the busyness may be determined by querying a register. The computer system 100' is analogous to the computer system 100. Thus, similar component have analogous labels. The computer system 100' also includes a memory controller 170 that arbitrates accesses of the memory modules 140, 150 and 160, which may be DIMMs. In FIG. 5, each memory module may represent a single module or multiple modules. In the computer system 100', the memory controller 170 includes a register 172 that stores a value indicating the busyness. The busyness may be calculated as described above and a numerical value stored in the register that indicate the busyness to the desired level of granularity.

When the system 100' of FIG. 5 implements the method 200 of FIG. 3, the determination of a busyness level in step 202 may include querying the register 172 of the memory controller 170. The projected response time and adaptive context switching of steps 204 and 206 of the method 200 may be made using the context switching module 120'. The latency of the hybrid memory module(s) 160 may be accounted for using the method 200 of FIG. 3, the memory controller 170 of FIG. 5 and the adaptive context manager 120 of FIG. 5. Context switching may thus be adapted to new memory module(s) 160. Because the busyness determination may be made via the register 172, implementation of the method 200 by the system 100' may be more efficient. As a result, memory transactions in the computer system 100' may be more efficiently managed.

Figure 6:
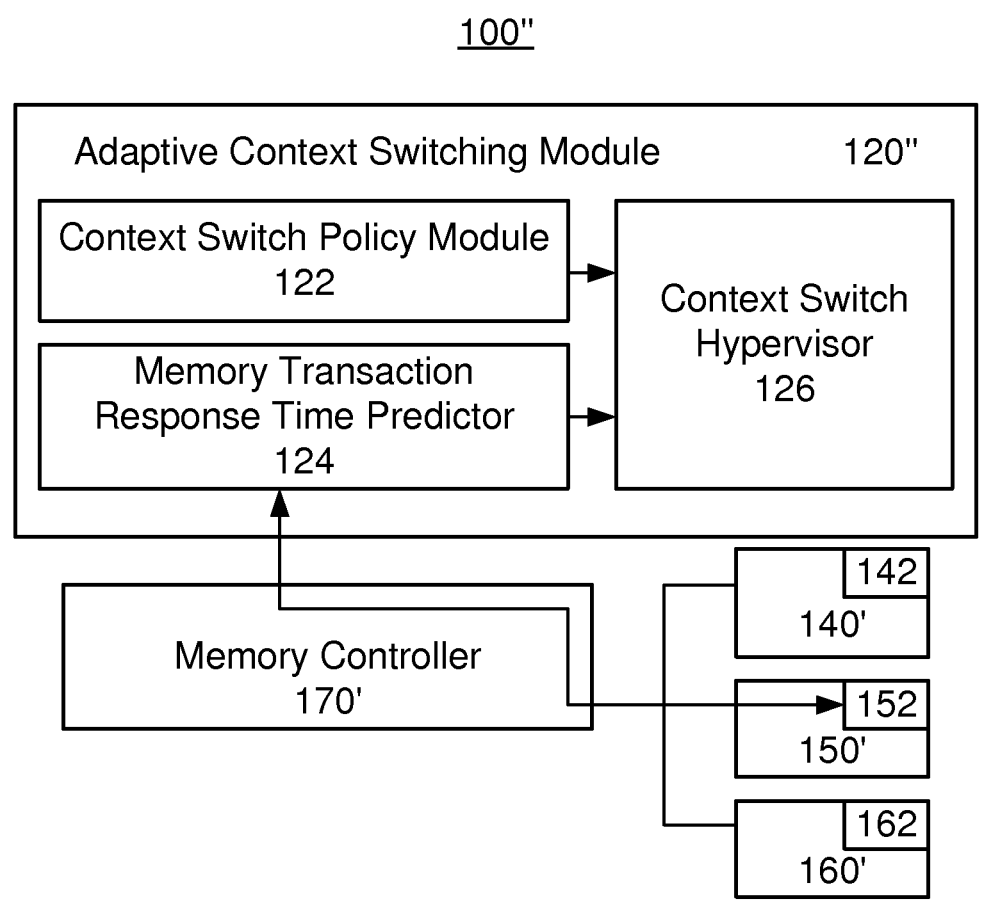
FIG. 6 is a block diagram of a computer system incorporating another exemplary embodiments of a context switching module utilizing hardware accessed busyness.

FIG. 6 depicts another embodiment of a computer system 100" in which the busyness may be determined by querying a register. The computer system 100" is analogous to the computer systems 100 and 100'. Thus, similar component have analogous labels. The computer systems 100" also includes a memory controller 170' that arbitrates accesses of the memory modules 140, 150 and 160, which may be DIMMs. In FIG. 6, each memory module may represent a single module or multiple modules. The computer system 100" includes a memory controller 170' that is analogous to the memory controller 170 and memory modules 140', 150' and 160' analogous to the modules 140, 150 and 160, respectively. Each of the memory modules 140', 150' and 160' includes a busyness register 142, 152 and 162, respectively. The registers 142, 152 and 162 store a numerical value that indicates the busyness of the particular module 140', 150' and 160', respectively, to the desired level of granularity. In some such embodiments, only the hybrid memory module(s) 160' include such a register. Such an embodiment is depicted in FIG. 6. In other embodiments, the memory controller 170' may include a register analogous to the register 172 depicted in FIG. 5. In such embodiments, both the memory controller 170' and the memory module(s) 140', 150' and 160' may include a busyness register 172, 142, 152 and 162, respectively.

When the system 100" of FIG. 6 implements the method 200 of FIG. 3, the determination of a busyness level in step 202 may include querying the appropriate register 142, 152 or 162 of the memory module 140', 150', or 160', respectively, being accessed. The projected response time and adaptive context switching of steps 204 and 206 may be made using the context switching module 120". The latency of the hybrid memory module(s) 160' may be accounted for using the method 200 of FIG. 3 and the adaptive context manager 120" of FIG. 6. Context switching may thus be adapted to new memory module(s) 160'. Because the busyness determination may be made via the registers 142, 152 and 162 implementation of the method 200 by the system 100" may be more efficient. As a result, memory transactions in the computer system 100" may be more efficiently managed.

Figure 7:
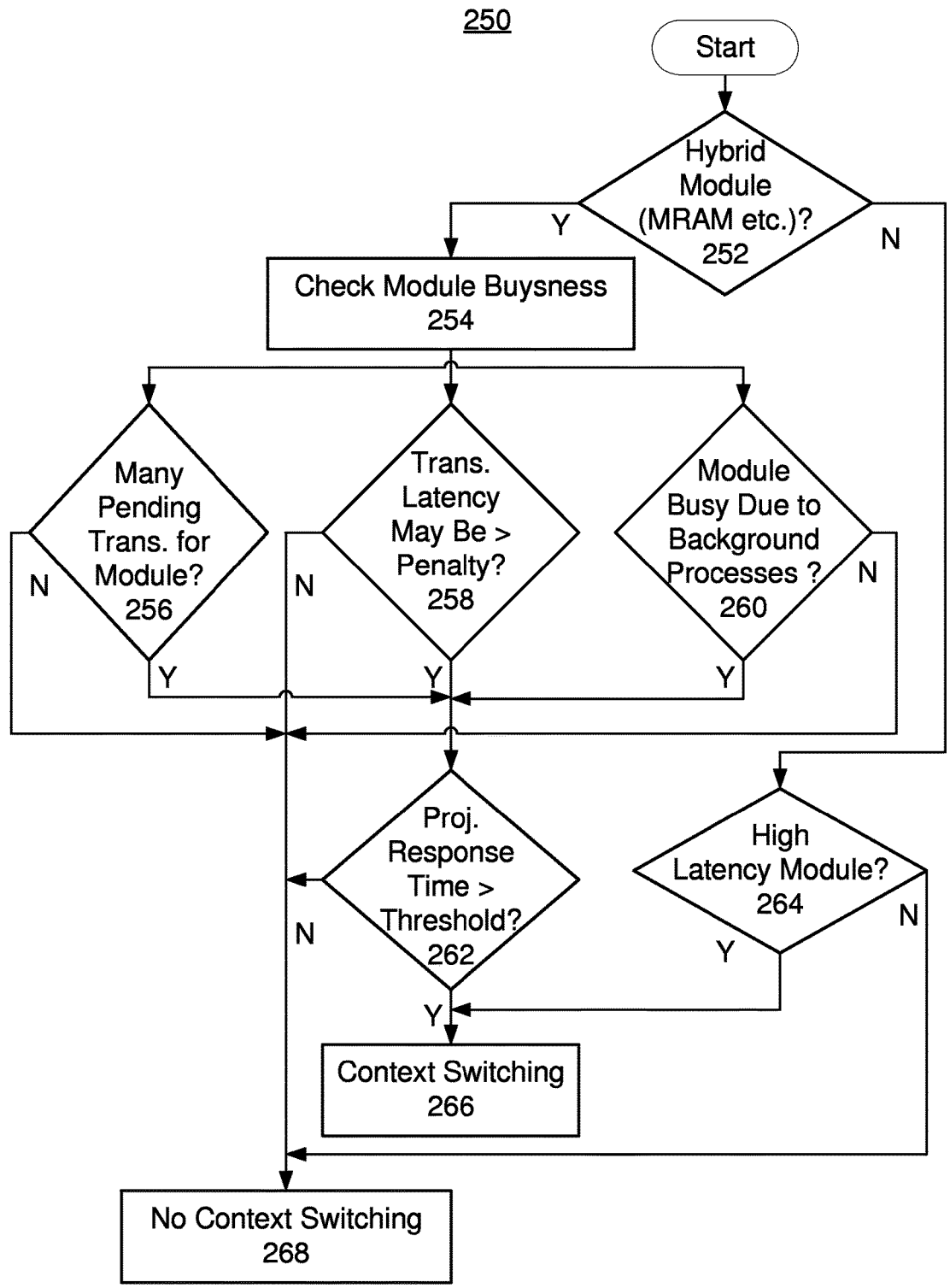
FIG. 7 is a flow chart depicting another exemplary embodiment of a method for performing adaptive context switching.

FIG. 7 is a flow chart depicting an exemplary embodiment of a method 250 for managing transactions for a memory module such as the memory module 140, 150 and/or, 160. For simplicity, some steps may be omitted or combined. The method 250 is described in the context of the computer system 100 and adaptive context switching module 120 of FIGS. 1-2. However, the method 250 may be used for other computer systems.

Referring to FIGS. 1-2 and 7, it is determined whether the incoming transaction accesses the memory module 160, via step 252. If not, then it is determined whether a high latency module, such as one of the modules 150, is being accessed, via step 264. If so, then context switching is performed, via step 266. If not, then no context switching is performed in step 268.

If the hybrid memory module 160 is the subject of the transaction, then in step 254 the busyness for the module 160 is probed. As discussed above, the busyness may be determined based on the global and/or local queue depths for the hybrid memory module 160. Thus, steps 256, 258 and 260 query various aspects of performance that may affect the response time. It is determined in step 256 whether there are many transactions pending for the module 160. The local read and/or write queue levels may be determined in step 256. In some embodiments, step 256 may include reading the appropriate register in a memory controller 170 and/or in the module 160/160'. It is determined whether the transaction at issue has a latency that is greater than a threshold, such as the context switching penalty, via step 258. For example, for an MRAM module, step 258 may include determining whether a write transaction is being processed. For such a module, a write transaction has a long latency that is on the order of fifty microseconds or more even when the hybrid memory module 160 is idle. Thus, the write latency is greater than the context switching time penalty. Such write transactions may be treated differently than read transactions, which may have a latency less than the context switching time penalty. It is also determined whether the hybrid memory module 160 is busy due to background processes, via step 260. Step 260 may be analogous to determining the global queue levels.

Thus, the busyness related to the hybrid memory module 160 is determined via step 254, 256, 258 and 260. In addition, a value representing the level of busyness may be calculated from steps 256, 258 and 260. If it is determined in steps 256, 258 and 260 that all of the indicators result in a determination that the memory module 160 is not busy, then no context switching is performed. Stated differently, if there are few transactions pending, the transaction latency is less than a threshold (e.g. the transaction is a read operation) and the module is not busy due to background processes, then no context switching is performed in step 268.

If any of steps 256, 258 and 260 indicate that the module 260 might be busy, then step 262 is performed. It is determined whether the projected response time is greater than a particular threshold, via step 262. In step 262, the projected response time may be calculated based on the busyness level. Thus, at least part of step 262 is analogous to part of step 204. Step 262 may include interpolating from a histogram of previous response times for the type of transaction for the memory module 106, determining the latency from latencies, or otherwise calculating the projected response time. Step 262 also includes comparing the projected response time with the relevant thresholds. In some embodiments, the threshold is the context switching penalty. In other embodiments, another threshold can be used.

If the threshold is not exceeded, then no context switching is performed for the transaction in step 268. In contrast, if the projected response time is greater than the threshold, then the context switching is performed, via step 266.

Using the method 250, adaptive context switching may be performed. The latency of the hybrid memory module(s) 160/160' of FIGS. 1-2, 5 and 6 may be accounted for using the method 250 and adaptive context manager 120/120'/120" of FIGS. 1-2, 5 and 6. Context switching may thus be adapted to new memory module(s) 160/160'. As a result, memory transactions in the computer system 100, 100' and/or 100" of FIGS. 1-2, 5 and 6 may be more efficiently managed.

A method and system for managing transactions for one or more memory modules has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A method for managing a transaction for a memory module of a plurality of memory modules, the plurality of memory modules having a plurality of latencies in a computer system, the method comprising:
   determining a busyness level of the memory module for the transaction, the step of determining the busyness level includes determining at least one queue depth, the at least one queue depth including at least one of a global request queue depth and at least one local memory queue depth for the plurality of memory modules; and
   predicting a projected response time for the transaction based on the busyness level.

2. The method of claim 1 wherein the step of determining the busyness level includes querying at least one register storing a value for the busyness level of the memory module, the at least one register residing in at least one of the memory module and at least one memory controller.

3. The method of claim 1 further comprising:
   determining whether to perform a context switching for the transaction based on the projected response time and at least one context switching policy; and
   performing the context switching if the step of determining whether to perform the context switching indicates the context switching is to be performed.

4. The method of claim 3 wherein the step of predicting the projected response time further includes:
   determining whether the busyness level exceeds a threshold.

5. The method of claim 4 wherein the step of determining the busyness level includes at least one of analyzing a plurality of recorded response times, reading a register storing at least one value indicating the busyness level and calculating a numerical projected response time based on the busyness level.

6. The method of claim 3 wherein the context switching has a time penalty and wherein the projected response time for a first busyness level of the memory module is less than the time penalty, wherein the projected response time for a second busyness level of the memory module is greater than the time penalty and wherein a response time for another memory module of the plurality of memory modules is always less than the time penalty or always greater than the time penalty.

7. The method of claim 6 wherein the step of performing context switching further includes:
   only determining the busyness level for the memory module only if the projected response time for the transaction for the first busyness level of the memory module is less than the time penalty and if the projected response time for the transaction for the second business of the memory module is greater than the time penalty.

8. The method of claim 1 further comprising:
   performing adaptive context switching if a latency of the memory module is not always less than and not always greater than a time penalty for a context switching, the step of performing the adaptive context switching including the busyness determining step and the projected response time predicting steps, the step of performing adaptive context switching further including performing a context switching for the transaction if the projected response time for the busyness level is greater than the time penalty.

9. The method of claim 8 further comprising:
if the latency of the memory module is always greater than a time penalty for a context switching, performing the context switching for the transaction; and
performing the context switching for the transaction if the projected response time for the busyness level is greater than the time penalty.

10. The method of claim 8 wherein the step of predicting the projected response time further includes:
determining whether the busyness level exceeds a threshold, the projected response time exceeding the time penalty if the busyness level exceeds the threshold.

11. A computing system comprising:
a plurality of memory modules coupled with a host system, the plurality of memory modules having a plurality of characteristic access latencies, at least one of the plurality of memory modules being a hardware memory module;
an adaptive context switching module including a memory transaction response time predictor for determining a busyness level for a transaction for a memory module of the plurality of memory modules and predicting a projected response time for the transaction; and
the memory transaction response time predictor determining the busyness level includes determining at least one queue depth, the at least one queue depth including at least one of a global request queue depth and at least one local memory queue depth for the plurality of memory modules.

12. The computer system of claim 11 wherein the adaptive context switching module performs context switching based on the projected response time.

13. The computer system of claim 12 wherein the memory transaction response time predictor includes at least one of a software determined response time indicating the busyness level and a busyness register for storing at least one value indicating the busyness level.

14. The computer system of claim 13 further comprising:
at least one memory controller for the plurality of memory modules, at least one of the memory module of the plurality of memory modules and the at least one memory controller including the busyness register.

15. The computer system of claim 11 wherein the adaptive context switching module further includes:
a context switch hypervisor for determining whether to perform the context switching based on the projected response time from the memory transaction response time predictor; and
a context switch policy module for receiving and storing a plurality of context switching policies for the plurality of memory modules, the context switch policy module providing to the context switch hypervisor at least one context switching policy for the memory module.

16. The computer system of claim 15 wherein the context switching has a time penalty and wherein the projected response time for a first busyness level of the memory module is less than the time penalty, wherein the projected response time is greater than the time penalty for a second busyness level of the memory module, and wherein a response time for another memory module of the plurality of memory modules is always less than the time penalty or always greater than the time penalty.

17. The computer system of claim 16 wherein the adaptive context switching module only determines the busyness level for the memory module only if the projected response time for the transaction for the first busyness level of the memory module is less than the time penalty and the projected response time for the transaction for the second busyness level is greater than the time penalty.

18. A computing system comprising:
a plurality of memory modules coupled with a host system, the plurality of memory modules having a plurality of characteristic access latencies, at least one of the plurality of memory modules being a hardware memory module;
at least one memory controller for the plurality of memory modules; and
wherein at least one of a memory module of the plurality of memory module and the at least one memory controller includes a busyness register for storing at least one value indicating a busyness level of the memory module, the busyness level being used to predict a projected response time for a transaction for the memory module, the busyness level includes being based on at least one queue depth, the at least one queue depth including at least one of a global request queue depth and at least one local memory queue depth for the plurality of memory modules.

* * * * *